(12) United States Patent
Montoriol et al.

(10) Patent No.: US 12,196,881 B2
(45) Date of Patent: Jan. 14, 2025

(54) POWER CONTROL FOR RADAR APPLICATIONS AND METHOD THEREOF

(71) Applicant: NXP USA, INC., Austin, TX (US)

(72) Inventors: Gilles Montoriol, Fonsorbes (FR); Cristian Pavao Moreira, Frouzins (FR); Maarten Lont, Eindhoven (NL); Antonius Johannes Matheus de Graauw, Haelen (NL)

(73) Assignee: NXP USA, Inc., Austin, TX (US)

( * ) Notice: Subject to any disclaimer, the term of this patent is extended or adjusted under 35 U.S.C. 154(b) by 644 days.

(21) Appl. No.: 17/361,511

(22) Filed: Jun. 29, 2021

(65) Prior Publication Data
US 2022/0018929 A1   Jan. 20, 2022

(30) Foreign Application Priority Data

Jul. 14, 2020  (EP) .................................... 20305801

(51) Int. Cl.
| G01S 7/35 | (2006.01) |
| G01S 7/02 | (2006.01) |
| G01S 13/02 | (2006.01) |
| G01S 13/34 | (2006.01) |

(52) U.S. Cl.
CPC .................... *G01S 7/35* (2013.01); *G01S 7/02* (2013.01); *G01S 13/02* (2013.01); *G01S 13/34* (2013.01)

(58) Field of Classification Search
CPC . G01S 7/35; G01S 13/34; G01S 13/02; G01S 7/02
See application file for complete search history.

(56) References Cited

U.S. PATENT DOCUMENTS

| 4,901,032 | A | 2/1990 | Komiak |
| 5,119,042 | A | 6/1992 | Crampton et al. |
| 7,345,620 | B2 | 3/2008 | Voiglaender et al. |
| 7,834,686 | B2 | 11/2010 | Staszewski et al. |
| 9,337,788 | B2 | 5/2016 | Wimpenny |
| 10,006,987 | B2* | 6/2018 | Pavao-Moreira ....... G01S 7/354 |
| 10,101,439 | B2 | 10/2018 | Yoo |

(Continued)

*Primary Examiner* — Timothy A Brainard
*Assistant Examiner* — Ismaaeel A. Siddiquee (57) ABSTRACT

A radar system includes a hybrid-power amplifier and a power control unit coupled to the hybrid-power amplifier. The power control unit is configured to control the amplification of a chirp signal output by the radar system based upon an assessment of an interchirp time provided by a chirp profile. The interchirp time is a time difference between a first chirp signal and a second chirp signal that are to be output by the hybrid-power amplifier. When the power control unit determines that the interchirp time is less than an interchirp time threshold, a fast-power loop control configuration is used to control the transmitted output power at hybrid amplifier level. When the power control unit determines that the interchirp time is equal to or greater than the interchirp time threshold, a slow-power loop configuration or a combination of the slow-loop configuration and the fast-loop configuration is used to control the transmitted output power at the hybrid-power amplifier. A look-up table generated by the power control unit in a controller is used to ascertain the control signals and values that are to be used by the hybrid-power amplifier and voltage regulator to amplify the chirp signal.

20 Claims, 4 Drawing Sheets

(56) References Cited

U.S. PATENT DOCUMENTS

| | | | | |
|---|---|---|---|---|
| 2008/0001809 A1* | 1/2008 | Woodington | ........... | G01S 7/023 |
| | | | | 342/70 |
| 2014/0312974 A1* | 10/2014 | Khesbak | ................... | H03F 3/21 |
| | | | | 330/279 |
| 2015/0002328 A1 | 1/2015 | Vaucher et al. | | |
| 2017/0294885 A1* | 10/2017 | Kang | ....................... | H04B 1/04 |
| 2019/0013814 A1* | 1/2019 | Thuries | .................. | H03H 11/20 |
| 2020/0264271 A1* | 8/2020 | Liu | ........................... | G01S 7/34 |

* cited by examiner

| CONF. NUM 410 | VDDA 137 420 | VC1 134-1 430 | VC2 134-2 440 | OUTPUT POWER 450 |
|---|---|---|---|---|
| 1 | VDDA_MAX | HIGH | HIGH | POUT1 |
| 2 | VDDA_MAX | HIGH | LOW | POUT2 |
| 3 | VDDA_MID | HIGH | HIGH | POUT3 |
| 4 | VDDA_MID | HIGH | LOW | POUT4 |
| 5 | VDDA_MIN | HIGH | HIGH | POUT5 |
| 6 | VDDA_MIN | HIGH | LOW | POUT6 |

POWER CONTROL FOR RADAR APPLICATIONS AND METHOD THEREOF

CROSS-REFERENCE TO RELATED APPLICATIONS

This application claims the priority under 35 U.S.C. § 119 of European Patent application no. 20305801.1, filed on 14 Jul. 2020, the contents of which are incorporated by reference herein.

BACKGROUND

Frequency Modulated Continuous Wave (FMCW) radar systems that are used in automotive applications utilize various amounts of power to transmit and receive frequency-modulated signals referred to as chirps. Several types of frequency modulations are known in the field of high-end FMCW radar systems. For example, in slow frequency modulation, the frequency of the transmitted continuous wave is modulated according to a triangular shaped wave. In fast frequency modulation the frequency of the transmitted continuous wave is modulated according to a sawtooth wave. The power used to transmit chirps in high-end FMCW radar systems, such as, for example, long-range radar (LRR) applications, low-end radar systems, short-range radar (SRR) and ultra-short range radar (USRR) applications, differ based on the varying constraints in terms of output power and maximum power allocated for each application. The amount of dissipated power allowed for FMCW radar systems in automotive applications is extremely limited based upon the space available for energy sources in the automobile. Improvements in handling the power dissipation for various radar applications is therefore desirable.

SUMMARY

Aspects of the disclosure are defined in the accompanying claims.

In a first aspect, there is provided a radar system, comprising a hybrid-power amplifier and a power control unit. The power control unit is coupled to the hybrid-power amplifier. The power control unit is configured to select a power control configuration based upon an assessment of an interchirp time, the power control configuration being applied to the hybrid-power amplifier to amplify a chirp signal that is transmitted by the radar system.

In one or more embodiments, the radar system may further comprise a chirp generator coupled to the power control unit, wherein the chirp generator generates the chirp signal that is amplified by the hybrid-power amplifier and output by the radar system.

In one or more embodiments, the interchirp time may be a time difference between an end of a first chirp signal and a start of a second chirp signal that are output by the hybrid-power amplifier.

In one or more embodiments, when the interchirp time is less than an interchirp time threshold, the power control configuration may be a fast-power control loop configuration that is used to adjust an amount of power used to amplify the chirp signal.

In one or more embodiments, when the interchirp time is equal to or greater than the interchirp time threshold, the power control configuration may be a slow-power control loop configuration or a combination of the slow-power control loop configuration and the fast-power control loop configuration that is used to adjust the amount of power used to amplify the chirp signal.

In one or more embodiments, the fast-power control loop configuration may utilize a first cascode arrangement coupled to a second cascode arrangement to amplify the chirp signal that is transmitted by the radar system.

In one or more embodiments, the slow-power control loop configuration may utilize a voltage regulator and a control signal from the power control unit to provide a supply voltage value that is used as supply voltage of the hybrid-power amplifier that amplifies the chirp signal.

In one or more embodiments, the first cascode arrangement and the second cascade arrangement may be located in a first stage of the hybrid-power amplifier, and the power control unit may use the first stage of the hybrid-power amplifier to adjust the amount of power to be transmitted by the radar system after amplification of the chirp signal by the hybrid-power amplifier.

In one or more embodiments, the radar system may further comprise a look-up table that is used by the power control unit to ascertain output control signals and output values that are used by the hybrid-power amplifier to amplify the chirp signal that is output by the radar system.

In a second aspect, there is provided a method, comprising providing an interchirp time to a power control unit of a radar system, and based upon an assessment of the interchirp time and a look-up table, adjusting output power of a chirp signal transmitted by the radar system.

In one or more embodiments, the assessment of the interchirp time may include determining whether the interchirp time between a first chirp signal and a second chirp signal is greater than, equal to, or less than an interchirp threshold value.

In one or more embodiments, when the interchirp time is less than an interchirp time threshold, a fast-power control loop configuration may be used to reduce an amount of power dissipated to amplify the chirp signal.

In one or more embodiments, when the interchirp time is equal to or greater than the interchirp time threshold, a slow-power control loop configuration or a combination of the slow-power control loop configuration and the fast-power control loop configuration may be used to reduce the amount of power dissipated to amplify the chirp signal.

In one or more embodiments, the fast-power control loop configuration may utilize a first cascode arrangement coupled to a second cascode arrangement to amplify the chirp signal that is output by the radar system.

In one or more embodiments, the look-up table may provide output values to a voltage regulator and a first stage of a hybrid-power amplifier for amplification of the chirp signal.

In one or more embodiments, the look-up table may provide output values that include a supply voltage value, at least a first gate voltage value and at least a second gate voltage value.

In a third aspect, there is provided a transceiver, comprising a hybrid-power amplifier and a power control unit. The power control unit is coupled to the hybrid-power amplifier. The power control unit is configured to conduct an assessment of an interchirp time and a look-up table and, based upon the assessment, the hybrid-power amplifier uses a first stage of the hybrid-power amplifier to adjust an amount of power used to amplify a chirp signal transmitted by the transceiver.

In one or more embodiments, during amplification of the chirp signal transmitted by the transceiver, a first transistor of a first cascode arrangement may be turned off in order to reduce the amount of power used to amplify the chirp signal.

In one or more embodiments, prior to the amplification of the chirp signal transmitted by the transceiver, the look-up table may be generated by the power control unit in a controller in order to ascertain control signals that are provided to the first stage of the hybrid-power amplifier to amplify the chirp signal.

In one or more embodiments, a voltage regulator that outputs a supply voltage whose value is provided from the look-up table may be used in combination with the first cascode arrangement and a second cascode arrangement to amplify the chirp signal.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-4 illustrate systems and methods that are used to adjust the amount of power transmitted and power dissipated by a hybrid-power amplifier in a radar system. In some embodiments, select power control configurations are utilized to adjust the amount of power provided at the output of the radar system for transmission of chirp signals. In some embodiments, depending on an amount of time between the transmitted chirp signals (i.e., interchirp time) and the output power transition between the chirp signals, a power control unit provides control signals to a hybrid-power amplifier that implements the selected power control configurations, such as a slow-power control configuration, fast-power control configuration, or combination thereof. The slow-power control configuration is a power control configuration that uses a voltage supply control signal provided to a voltage regulator to control the amplification of the chirp signals that are provided to the hybrid-power amplifier. The fast-power control configuration is a power control configuration that uses digital control signals provided to gate voltages of cascode transistors of the hybrid-power amplifier to control the amplification level of the chirp signals (output power) that are further transmitted by the radar system.

In some embodiments, in order to select whether the slow-power control configuration or the fast-power control configuration or combination thereof, the power control unit first generates a look-up table (LUT) that the power control unit 1 further uses to set the voltage values that are to be provided as control signals to the hybrid-power amplifier. The LUT includes voltage values that are to be provided to a first stage (and optionally additional stages such as a second stage) of the hybrid-power amplifier for amplification of the chirp signals. In some embodiments, after the LUT has been generated, the power control unit assesses the chirp signals via, for example, its profile information, to determine the amount of time available between the chirp signals. That is, in some embodiments, the power control unit compares the interchirp time to an interchirp time threshold to determine whether the fast-power control loop configuration or a combination of the slow-power control loop configuration and the fast-power control loop configuration is to be used as the power control method, which saves power during amplification of the chirp signal. In some embodiments, when the interchirp time is less than the interchirp time threshold (due to the limited amount of time available for power reduction), only the fast-power control loop configuration is selected to change the transmitted power during amplification of the chirp signal. In some embodiments, when the interchirp time is greater than or equal to the interchirp time threshold (due to the increased amount of time available for power reduction), both the slow-power control configuration and the fast-power control configuration are selected to change the transmitted power during the amplification of chirp signal.

In some embodiments, because the fast-power control configuration utilizes the gate voltages of cascode transistors to control amplification level of the chirp signals, the power control unit is able to turn on and off transistors in the hybrid-power amplifier to adjust power amplification faster than the slow-power mode configuration, which uses a voltage regulator and associated voltage regulation loop to control amplification by utilizing the hybrid-power amplifier supply value. By combining both the slow-power control configuration and the fast-power control configuration, the hybrid-power amplifier is able to provide sufficient power amplification while having the ability to turn-off unnecessary transistors during, for example, idle time where the radar system is not being used for continuous transmission. The combined hybrid-power control technique allows the dynamic scaling of the transmitted output power with the fast and slow time responses, allowing the same radar system to operate in different applications while achieving an optimal transmitted power to power dissipation trade off.

Figure 1:
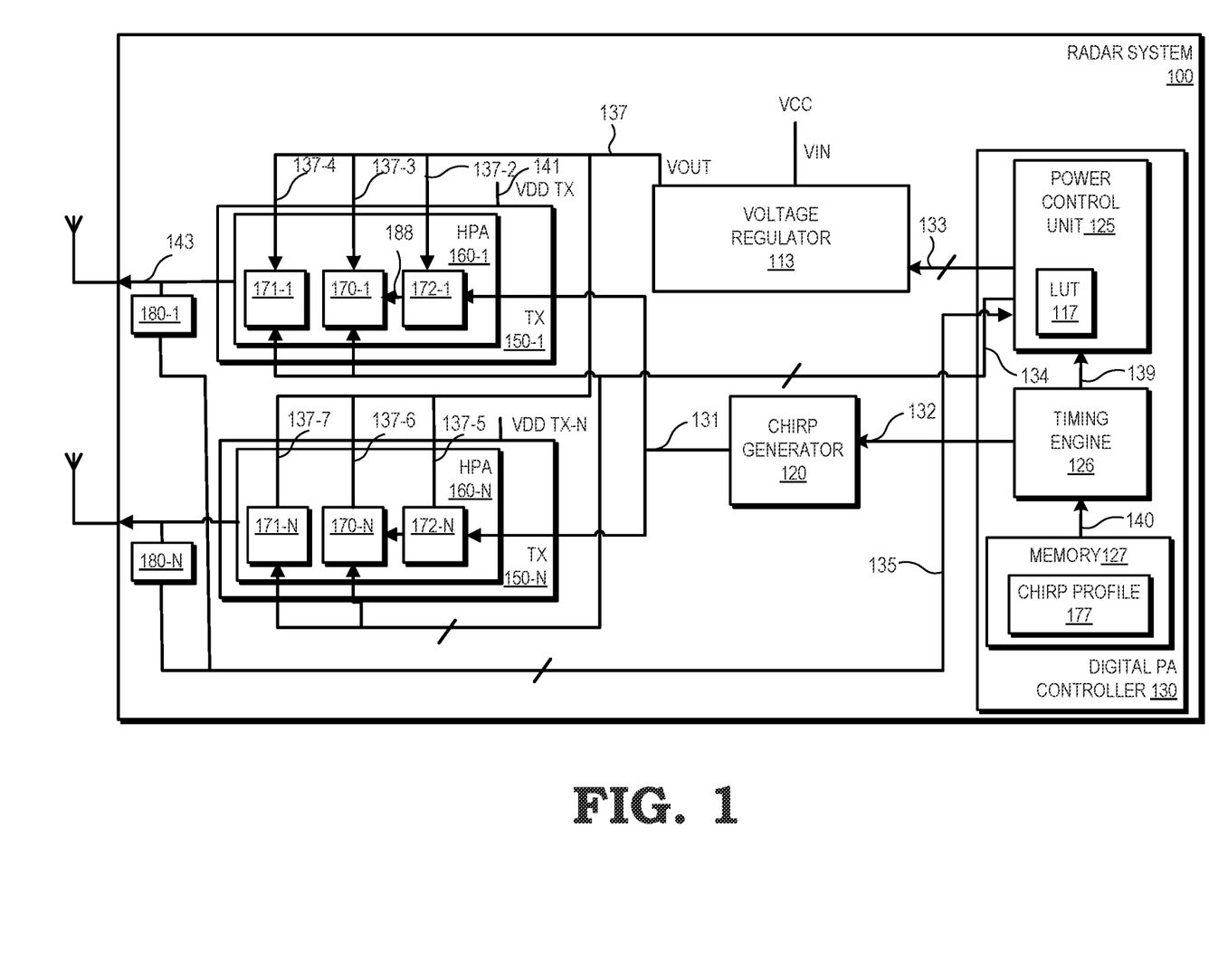
FIG. 1 is a block diagram of a radar system in accordance with some embodiments.

FIG. 1 illustrates a radar system 100 in accordance with some embodiments. In some embodiments, radar system 100 includes a controller 130, a voltage regulator 113, chirp generator 120, transmitters 150-1-150-N, receivers (not shown), and power detectors 180-1-180-N. Controller 130 includes a power control unit 125, a timing engine 126, and a memory 127. Transmitters 150-1-150-N include hybrid-power amplifiers 160-1-160-N. Hybrid-power amplifier 160-1 includes a driver 172-1, a first-stage 170-1, and a second stage 171-1. In some embodiments, the hybrid-power amplifier is considered "hybrid" because the amplification level of the hybrid-power amplifier can be controlled via its supply (analog control) and/or via the 'on/off' control of the gate voltages of cascode devices (digital control). In some embodiments, a plurality of power amplifiers N include a driver 172-N, a first-stage 170-N, and a second stage 171-N. In some embodiments, the number of hybrid-power amplifiers is equal to the number of power detectors in radar system 100.

In some embodiments, in order to initiate the process of generating chirps that are to be transmitted as RF output signal 143 by the radar system 100, a chirp profile 177 is provided to timing engine 126 from memory 127 via output signal 140. The chirp profile is a profile that includes a set of chirp parameters for a chirp that is to be transmitted by radar system 100. For example, the chirp profile 177 includes a parameter specifying the amount of time between chirps (interchirp time or Tdwell time), a power level of each chirp to be transmitted, an enable parameter that indicates which transmitters 150-1-150-N are to be enabled for transmission of a chirp, a starting frequency parameter that specifies the initial frequency of a chirp, a ramp slope parameter for specifying the slope of the frequency ramp of a chirp, etc. Using the chirp profile, the chirp that is transmitted as RF output signal 143 is configured to be transmitted by radar system 100 based upon the type of radar application described in the chirp profile, for example, long-range radar (LRR), short-range radar (SRR), and ultra-short range radar (USRR) that is to be implemented by the radar system 100.

Timing engine 126, which is configured to control the timing of the radar system 100, includes functionality to read the chirp parameters. Timing engine 126 receives the chirp profile 177 from memory 127 and uses the chirp profile 177 to control the start time and stop time of chirp signals 131 output by chirp generator 120 to the hybrid-power amplifier 160-1. In some embodiments, timing engine 126 provides, for example, a chirp control signal 132 to chirp generator 120 that indicates the start of each chirp and controls the frequency ramping of each chirp output by chirp generator 120. In some embodiments, timing engine 126 is also configured to provide time engine control signal 139 to power control unit 125 to provide the chirp parameters that are indicative of the amount of time between chirps (i.e., interchirp time or Tdwell time) and the power level to be transmitted for each chirp. In some embodiments, power control unit 125 uses the amount of interchirp time, as well as a look-up table (LUT) 117 that includes the power level of each chirp (described further in detail below), to determine which power control configuration or mode of a plurality of power control configurations (e.g., slow-power control loop mode and/or fast-power control loop mode discussed further in detail below) is selected for power amplification and to reduce the amount of power dissipated by radar system 100. The reduction of transmitted power during, for example, the interchirp time, allows the radar system 100 to reduce power consumption that is critical for efficient automotive radar system design due to the limited amount of battery space or power sources available in a vehicle.

Chirp generator 120 receives the chirp control signal 132 and generates chirp signals 131 based upon the control parameters (e.g., start, stop, duration) provided by the timing engine 126. That is, chirp generator 120 is configured to produce a frequency modulated continuous wave (FMCW) chirp signal 131 at a frequency which may be, for instance, 77 GHz, or some other frequency typically utilized by radar systems in automotive applications. Chirp generator 120 generates, for example, FMCW chirp signals 131 for transmission by radar system 100 based on the chirp control signal 132 provided from timing engine 126. Chirp generator 120 provides the chirp signals 131 to hybrid-power amplifier 160-1 for amplification according to the power control configuration indicated by power control unit 125. In some embodiments, chirp signals 131 are provided to first stage 170-1 of hybrid-power amplifier 160-1 via driver 172-1 as chirp signals 188 for amplification. In some embodiments, chirp signals 131 are provided directly to first stage 170-1 of hybrid-power amplifier 160-1 for amplification (which means that, in some embodiments, a driver stage, such as, driver 172-1, is not necessary or utilized for power amplification.)

Power control unit 125 receives time engine control signal 139 and generates LUT 117 that includes output voltage values (supply voltage represented using voltage regulator input control signal 133 and cascode voltages represented using digital signal 134) that are to be provided to a voltage regulator 113 and a first stage 170-1 (and optionally additional stages such as second stage 171-1) of hybrid-power amplifier 160-1 for amplification of the chirp signals 131. As exemplified in FIG. 4, the LUT 117 generated by power control unit 125 includes a supply voltage value VDDA, a digital logic voltage value VC1, and a digital logic voltage value VC2, as well as the output power values to be transmitted by radar system 100, at 143, 131. In some embodiments, power control unit 125 is configured to control hybrid-power amplifier 160-1 to operate in a fast-power control mode (fast-power control loop configuration), a slow-power control mode (slow-power control loop configuration), or a fast-slow power control combination mode (fast-slow power control loop configuration).

The slow-power control loop mode is a configuration that utilizes a voltage regulator 113 and a matching circuit (depicted in further detail in FIG. 2) in conjunction with LUT 117 to control the power of the RF output signal 143 output by the hybrid-power amplifier 160-1. The slow-power control loop configuration works, in conjunction with the fast-power control loop configuration, by using the voltage regulator input control signal 133 from power control unit 125 to control the amount of supply voltage 137 (i.e., VDDA) provided to first-stage 170-1 (and optionally a second stage 171-1 in an alternate multi-stage embodiment) of the hybrid-power amplifier 160-1. That is, in the slow-power control mode, the power of RF output signal 143 output by the hybrid-power amplifier 160-1 is controlled by adjusting the supply voltage 137 using the voltage regulator 113 that is controlled by voltage regulator input control signal 133.

In some embodiments, the slow-power control loop mode is used in instances where power control unit 125 determines that the time between chirp signals (interchirp time or Tdwell time) is at or above an interchirp time threshold. That is, power control unit 125 receives time engine control signal 139 (which includes information indicative of the amount of time between chirps) and determines whether the interchirp time is at or above the interchirp time threshold. When power control unit 125 determines that the interchirp time is at or above the interchirp time threshold (e.g., 21 microseconds, which is the case for some LRR applications), power control unit 125 utilizes the slow-power control loop mode, which, based upon, for example, pre-programmed supply voltages specified in LUT 117, outputs a voltage regulator input control signal 133 that corresponds to the supply voltage to be generated by voltage regulator 113 for amplification of the chirp signal 131. Thus, in some embodiments, power control unit 125 uses the voltage regulator input control signal 133 to control the supply voltage 137 that is provided at the output of the voltage regulator 113 using the slow-power control loop configuration. That is, when the slow-power loop configuration is selected by power control unit 125, power control unit 125 is configured to utilize LUT 117 to select the amount of supply voltage to be provided to hybrid-power amplifier 160-1.

As stated previously, in addition to power control unit 125 controlling the power transmitted and the power dissipated by the hybrid-power amplifier 160-1 using the slow-power control loop mode, the power control unit 125 is also able to control the transmitted power and consequently the power dissipated by the hybrid-power amplifier 160-1 using the fast-power control loop mode. The fast-power control loop mode is a configuration that controls the power of the RF output signal 143 output by the hybrid-power amplifier 160-1 by controlling the gate voltage of cascode transistors in first stage 170-1 or optionally a second stage 171-1 of hybrid-power amplifier 160-1. The cascode transistors (described further in detail with reference to FIG. 2) include NMOS transistors that are turned on or off using digital signal 134 based upon the duration of the time between chirp signals (interchirp time) provided by time engine control signal 139 of timing engine 126. That is, as stated previously, the fast-power control loop mode is used in instances where power control unit 125 determines that the time between chirp signals (Tdwell time) is minimal or below a certain minimum threshold. For example, in some embodiments, when power control unit 125 determines that the interchirp time is below tmax (e.g., 4 microseconds, which is the case for some LRR applications) the fast-power control loop configuration is utilized to adjust the amount of power to be transmitted by hybrid-power amplifier 160-1. Thus, the fast-power control loop mode is able to adjust or reduce the transmitted power in instances where the slow-power control loop mode is too slow to reduce transmitted power within the given time frame or interchirp time.

For example, the fast-power control loop configuration is used by radar system 100 when the interchirp time is minimal (below the interchirp threshold), such as for a interleaved multimode usecase. In some embodiments, the interleaved multimode is a mode where a chirp sequence has a typical or normal Tdwell time (e.g., 4 microseconds), with an associated chirp time (e.g., 10 microseconds), and where at least two profiles are alternated between each chirp. The transmission time of the chirp is minimal compared to the transmission time of the chirp during the slow-mode configuration. It is important to note that, in some embodiments, for interchirp times that are equal to above the interchirp time threshold, the fast-power control loop mode is used in combination with the slow-power control loop mode to decrease power consumption (or dissipation) of the radar system 100. Turning the transistors off while not in use or in silent mode during chirp transmission saves power in the radar system 100. Using both the slow-power control loop configuration and the fast-power control loop configuration, radar system 100 is able to reduce the amount of power dissipated by the hybrid-power amplifier 160-1 during the interchirp time while still providing the desired transmit output power for RF output signal 143 of the radar system 100.

In some embodiments, a power detector output signal 135 may also be used in the process of controlling, monitoring or maintaining the appropriate amount of power dissipated and output by the hybrid-power amplifier 160-1. The power detector output signal 135 is provided to the power control unit 125 from power detector 180-1. Power detector 180-1 is configured to detect the amount of power that is output and transmitted by hybrid-power amplifier 160-1. In some embodiments, power detector 180-1 is implemented using power sensor circuits and systems known in the art. Power detector 180-1 receives the output of hybrid-power amplifier 160-1 and detects or measures the power of the RF output signal 143. Power detector 180-1 provides the power level detected via power detector output signal 135 to power control unit 125 that uses the detected power level for the process of controlling or maintaining the amount of power dissipated and output by the hybrid-power amplifier 160-1.

Figure 2:
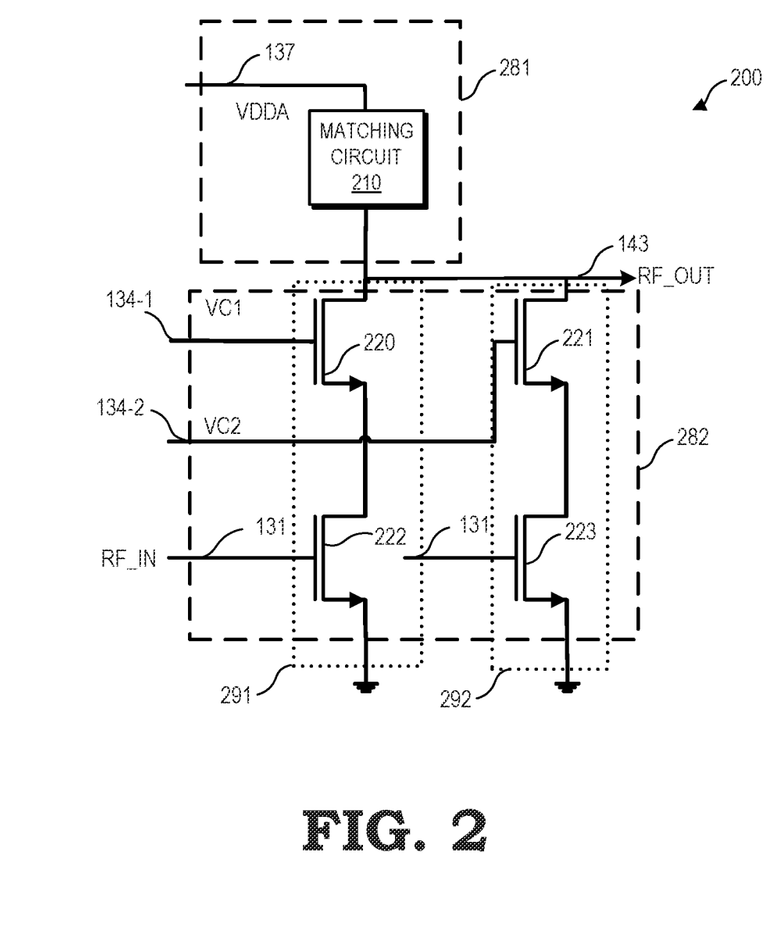
FIG. 2 is a block diagram of a power amplifier power control configuration in the radar system of FIG. 1 in accordance with some embodiments.

FIG. 2 illustrates a hybrid-power amplifier power control configuration 200 of the radar system 100 of FIG. 1 in accordance with some embodiments. In some embodiments, the hybrid-power amplifier power control configuration 200 is implemented in a first stage 170-1 of hybrid-power amplifier 160-1. In some embodiments, the hybrid-power amplifier power control configuration 200 is implemented in the first stage 170-1 and a second stage 171-1 of the hybrid-power amplifier 160-1. In alternate embodiments, the hybrid-power amplifier power control configuration 200 may be implemented in additional stages of the hybrid-power amplifier 160-1 or additional stages of transmitters 150-1 through 150-N. The hybrid-power amplifier power control configuration 200 includes a slow-power control loop configuration 281 and a fast-power control loop configuration 282. The slow-power control loop configuration 281 includes a matching circuit 210 coupled to voltage regulator 113 (not shown) and drains of a first transistor 220 (NMOS transistor 220 or NMOS cascode transistor 220) and a second transistor 221 (NMOS transistor 221 or NMOS cascode transistor 221). In some embodiments, the matching circuit 210 is used to tune the hybrid-power amplifier 160-1 to a desired center frequency of the radar system 100 (e.g., 77 GHz).

The fast-power control loop configuration 282 includes a first cascode arrangement (or set) 291 and a second cascode arrangement (or set) 292. The first cascode arrangement 291 includes a first cascode transistor 220 (NMOS cascode transistor 220) and first input transistor (NMOS transistor 222). The second cascode arrangement 292 includes a second cascode transistor 221 (NMOS cascode transistor 221) and a second input transistor (NMOS transistor 223). The gate of NMOS cascode transistor 220 is coupled to power control unit 125, the source of NMOS cascode transistor 220 is coupled to the drain of NMOS input transistor 222, and the drain of NMOS cascode transistor 220 is coupled to the matching circuit 210 and the drain of NMOS cascode transistor 221 at the output node that provides the RF output signal 143. The gate of NMOS cascode transistor 221 is coupled to power control unit 125, the source of NMOS cascode transistor 221 is coupled to the drain of NMOS input transistor 223, and the drain of NMOS cascode transistor 221 is coupled to matching circuit 210 and the drain of NMOS cascode transistor 220 at the output node that provides the RF output signal 143. The gate of NMOS input transistor 222 is coupled to chirp generator 120 or to driver 172-1, the source of NMOS input transistor 222 is coupled to ground, and the drain of NMOS input transistor 222 is coupled to the source of NMOS cascode transistor 220. The gate of NMOS transistor input 223 is coupled to chirp generator 120 via driver 172-1 (not shown), the source of NMOS input transistor 223 is coupled to ground, and the drain of NMOS input transistor 223 is coupled to the source of NMOS cascode transistor 221.

In operation of hybrid-power amplifier power control configuration 200, NMOS transistor 220 receives VC digital signal 134-1 from power control unit 125, NMOS transistor 222 receives chirp signal 131 from chirp generator 120 (or input chirp signal 188 from driver 172-1), and matching circuit 210 receives supply voltage 137 from voltage regulator 113. As stated previously, the amount of supply voltage 137 provided to first stage 170-1 and whether the VC digital signal 134-1 and VC digital signal 134-2 received by first stage 170-1 are a logic level high or a logic level low are determined by power control unit 125 selecting output power values that are stored in LUT 117 (i.e., VDDA, VC1, and VC2 of LUT 117) for the selected power configuration (e.g., slow-power control loop configuration, fast-power control loop configuration, or combination thereof).

In some embodiments, for a given power configuration selection made by power control unit 125 based on the interchirp time (indicated by time engine control signal 139) and power transition from a first chirp output power to a second chirp output power, power control unit 125 provides an associated supply voltage value 137, cascode control voltages VC1 (i.e., VC digital signal 134-1) and VC2 (i.e., VC digital signal 134-2) to matching circuit 210, NMOS transistor 220 and NMOS transistor 221, respectively.

In some embodiments, for example, when power control unit 125 determines that the power transition from a first chirp to a second chirp is POUT1 to POUT2 (described in detail below with reference to FIG. 4), power control unit 125 adjusts only the output VC2 (for VC digital signal 134-1) from high to low and does not adjust VDDA. In this case, since VDDA stays the same (i.e., from VDDA_MAX to VDDA_MAX) and only the VC2 changes (i.e., from HIGH to LOW), then the power control configuration is considered a fast-power control loop configuration which is used in circumstances where power control unit 125 determines that interchirp time (set by, for example, the chirp profile) between a first chirp and a second chirp is less than the interchirp time threshold.

Figure 4:
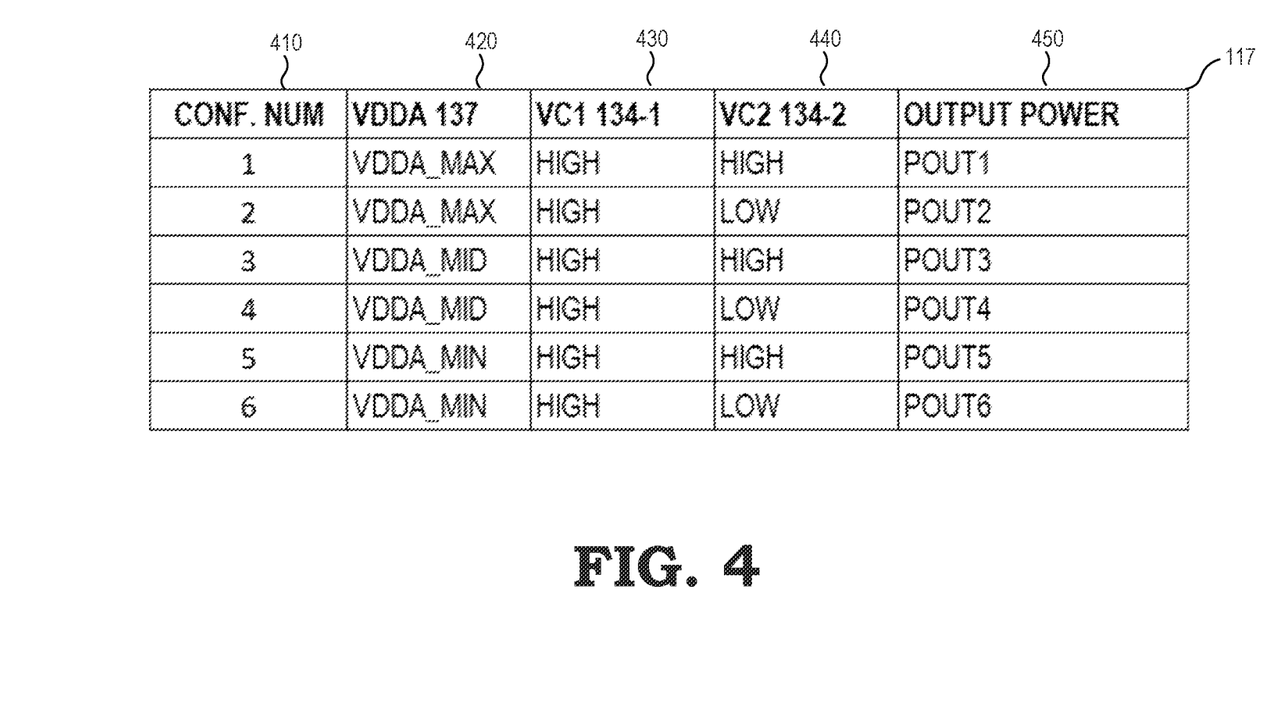
FIG. 4 is an example of a look-up table used in the power amplification control method of the radar system of FIG. 1 in accordance with some embodiments.

In some embodiments, for example, when power control unit 125 determines that the power transition from a first chirp to a second chirp is POUT1 to POUT3, power control unit 125 does not adjust the output VC2 (for VC digital signal 134-1) from high to low and adjusts VDDA. In this case, since VDDA changes (i.e., from VDDA_MAX to VDDA_MID) and VC2 does not change (i.e., stays at logic level high and NMOS transistor 221 stays on), and transmitted power is not reduced using the fast-power control loop configuration since neither NMOS transistor 220 or NMOS transistor 221 are turned off.

In some embodiments, by turning off NMOS transistor 221 when the pre-selected or pre-configured by chirp profile 177 interchirp time is minimal (below the interchirp time threshold) and by turning off NMOS transistor 221 when the interchirp time is above the threshold, power control unit 125 reduces the amount of power consumed during the amplification process of chirp signal 131 provided as RF input. That is, the digital signals (VC1 and VC2) whose value is either a logic high or a logic low value is used to turn on or off the cascode devices in first stage 170-1 or 171-2 to increase or decrease the power provided (transmitted) by the hybrid-power amplifier 160-1. When the cascode stage is turned off, current no longer circulates in the cascode stage and there is no amplification provided by the cascode stage (either the first cascode arrangement 291 or the second cascode arrangement 292) that has been turned off, i.e., the transmitted power is decreased.

Figure 3:
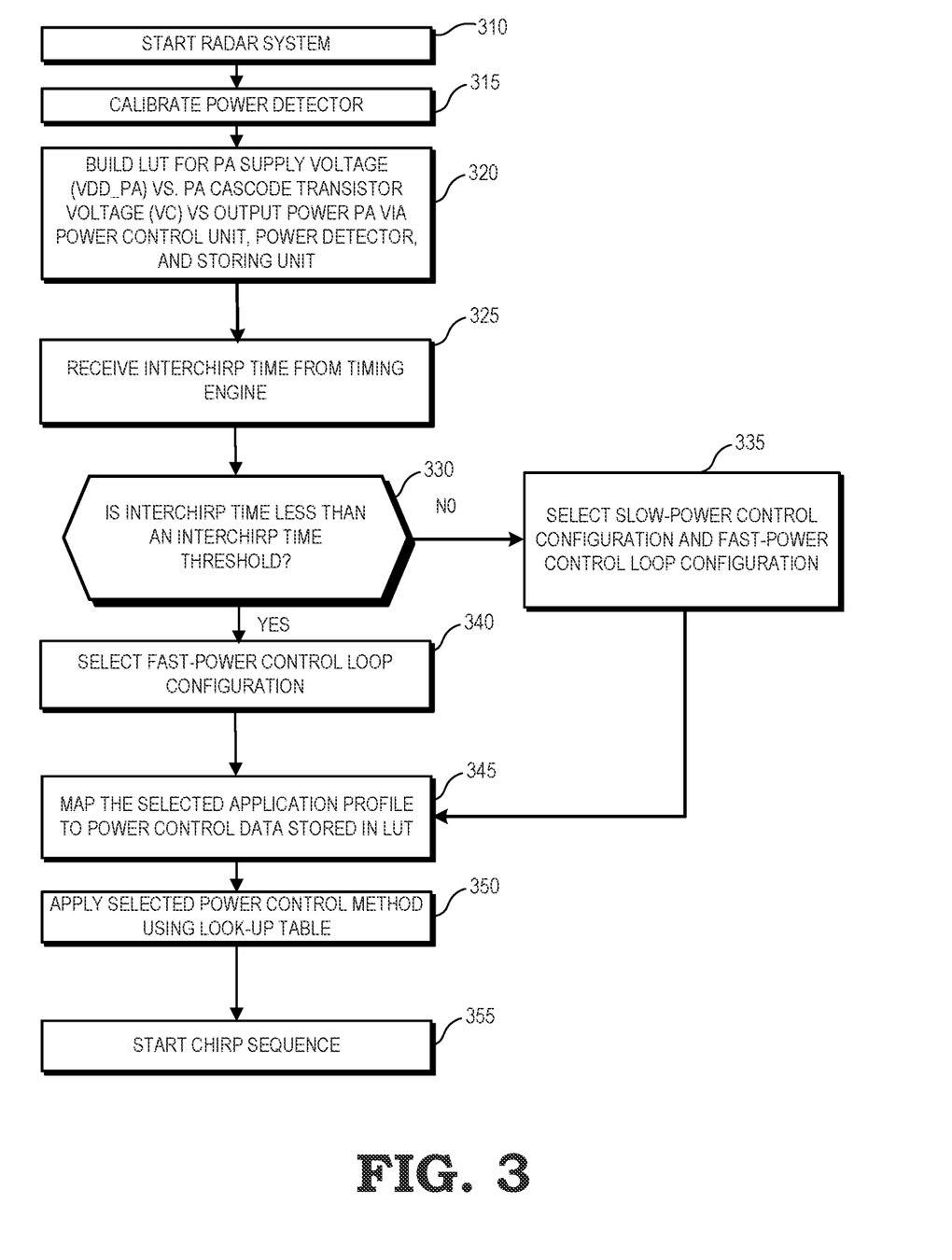
FIG. 3 is a flow diagram of a power amplification control method used in the radar system in accordance with some embodiments.

FIG. 3 illustrates a method 300 for reducing the dissipated power used in a hybrid-power amplifier 160-1 during the amplification of a chirp signal by radar system 100 of FIG. 1 according to some embodiments. FIGS. 1, 2, and 4 are used to describe the method 300. At blocks 310 and 315, the radar system 100 is started and the power detector 180-1 is calibrated. At block 320, power control unit 125 generates or builds LUT 117 for hybrid-power amplifier 160-1. As stated previously, the LUT 117 includes output values (VDDA, VC1, and VC2) that are provided by power control unit 125 to hybrid-power amplifier 160-1 to control first stage 170-1 (and optionally second stage 170-2) of the hybrid-power amplifier 160-1 to generate a corresponding output power during power amplification. The output values (VDDA, VC1, and VC2) are mapped to the output powers for radar system 100 for power transitions between chirps provided from chirp profile 177 of memory 127.

In some embodiments, at block 325, an interchirp time is received from timing engine 126. At block 330, power control unit 125 compares the interchirp time to an interchirp time threshold to determine whether a fast-power control loop configuration or a combination of a slow-power control loop configuration and a fast-power control loop configuration is going to be used to save dissipated power during amplification of the chirp signal 131. In some embodiments, at block 340, when the interchirp time is less than the interchirp time threshold, only the fast-power control loop configuration is selected to reduce transmitted power during amplification of the chirp signal 131 (due to, for example, the limited amount of time available between chirps for power reduction). In some embodiments, the interchirp time is dictated by the usecase or application, while the interchirp time threshold is determined or fixed by the implementation limits of the power control loop a supply voltage, e.g., using the slow-power control loop configuration, or via cascode voltage digital selection, e.g., using the fast power control loop configuration). In some embodiments, at block 335, when the interchirp time is greater than or equal to the interchirp time threshold, both the slow-power control configuration and the fast-power control configuration are selected to reduce power during the amplification of chirp signal 131. At block 345, power control unit 125 maps the selected configuration to the output power transition stored in LUT 117. At block 350, the power control configuration selected at blocks 340 or 350 is applied using LUT 117. That is, the output voltage values for VDDA, VC1, and VC2 are provided to, for example, first stage 170-1, of hybrid-power amplifier 160-1. At block 355, chirp generator 120 starts the chirp sequence and hybrid-power amplifier 160-1 applies the designated output voltage values of block 350 (e.g., VDDA, VC1, VC2)

FIG. 4 illustrates LUT 117 that is used to adjust the amount of power transmitted by hybrid-power amplifier 160-1 of radar system 100 in accordance with some embodiments. LUT 117 includes a configuration number column 410 that indicates a configuration number associated with a first output power POUT1 of an output power column 450, a voltage supply column 420 indicative of a supply voltage associated with the first output power POUT1, a digital voltage column 430 indicative of a VC digital signal 134-1 (logic level high or logic level low) associated with the first output power POUT1 of output power column 450, a digital voltage column 440 indicative of a VC digital signal 134-2 associated with the first output power POUT1 of output power column 450, and the output power column 450 that includes the first output power POUT1 through a sixth output power POUT6 that is mapped to the corresponding supply voltage 137, VC digital signal 134-1, and VC digital signal 134-2. In some embodiments, LUT 117 depicted in FIG. 4 includes six output power selections, however, the number of output power selections may vary depending on, for example, the output power range, power steps, and power steps accuracy of the radar system 100.

Power control unit 125 uses the LUT 117 to ascertain the output values of power control unit 125 that are provided to hybrid-power amplifier 160-1 and voltage regulator 113 for the corresponding power control configuration (slow-power control configuration and/or fast-power control configuration). That is, power control unit 125 uses the LUT 117 to ascertain the values of supply voltage 137, VC digital signal 134-1, and VC digital signal 134-2 that are to be output by the power control unit 125 and provided to each stage of the (e.g., the first stage 170-1, second stage 171-1) of hybrid-power amplifier 160-1. In some embodiments, by assessing the power output transition (i.e., from a first output power in output power column 450 to a second output power in the output power column 450), the power control unit 125 is able to determine the control signals (e.g, VDDA, VC1, VC2) to provide to hybrid-power amplifier 160-1.

In some embodiments, for example, when power control unit 125 determines that the power transition from a first chirp to a second chirp is POUT1 to POUT2, power control unit 125 outputs VDDA_MAX for supply voltage 137, a logic level high for VC digital signal 134-1, and a logic level low for VC digital signal 134-2. The logic level low provided to NMOS cascode transistor 221 (depicted in FIG. 2) using VC digital signal 134-2 turns off the transistor during the power transition and thereby saves power during amplification of the chirp signal 131 (i.e., RF_IN in FIG. 2).

In some embodiments, when power control unit 125 determines that the power transition from a first chirp to a second chirp is POUT1 to POUT3, power control unit 125 outputs VDDA_MID for supply voltage 137, a logic level high for VC digital signal 134-1, and a logic level high for VC digital signal 134-2. The logic level high provided to NMOS cascode transistor 221 (depicted in FIG. 2) using VC digital signal 134-2 keeps the NMOS cascode transistor 221 on during the power transition and amplification of the chirp signal 131.

In some embodiments, when power control unit 125 determines that the power transition from a first chirp to a second chirp is POUT1 to POUT4, power control unit 125 outputs VDDA_MID for supply voltage 137, a logic level low for VC digital signal 134-1, and a logic level high for VC digital signal 134-2. The logic level low provided to NMOS cascode transistor 221 (depicted in FIG. 2) using VC digital signal 134-2 turns the NMOS cascode transistor 221 off during the power transition and amplification of the chirp signal 131, thereby saving power during amplification of the chirp signal 131.

In some embodiments, when power control unit 125 determines that the power transition from a first chirp to a second chirp is POUT1 to POUT6, power control unit 125 outputs VDDA_MIN for supply voltage 137, a logic level low for VC digital signal 134-1, and a logic level high for VC digital signal 134-2. The logic level low provided to NMOS cascode transistor 221 using VC digital signal 134-2 turns the NMOS transistor 221 off during the power transition and amplification of the chirp signal 131, thereby saving power during amplification of the chirp signal 131. In some embodiments, the logic value used to control gate of cascode transistors (e.g., VC1, VC2 . . . VCN) may not necessarily be a low logic value of zero, but instead a logic value that is able to turn off the cascode stage(s) that utilize NMOS cascode transistor 220 and NMOS cascode transistor 221 in such a manner that no current flows in the first cascode arrangement 291 or the second cascode arrangement 292 (depicted in FIG. 2). Similarly, in some embodiments, output values from power control unit 125 for other power transitions (POUT2 to POUT5, POUT3 to POUT6, etc.) are ascertained by power control unit 125 using LUT 117.

In some embodiments, a radar system includes a hybrid-power amplifier and a power control unit coupled to the hybrid-power amplifier. The power control unit is configured to select a power control configuration based upon an assessment of an interchirp time. The power control configuration is applied to the hybrid-power amplifier to amplify a chirp signal that is transmitted by the radar system.

In some embodiments, the radar system includes a chirp generator coupled to the power control unit. The chirp generator generates the chirp signal that is amplified by the hybrid-power amplifier and output by the radar system.

In some embodiments of the radar system, the interchirp time is a time difference between an end of a first chirp signal and a start of a second chirp signal that are output by the hybrid-power amplifier.

In some embodiments of the radar system, when the interchirp time is less than an interchirp time threshold, the power control configuration is a fast-power control loop configuration that is used to adjust an amount of power used to amplify the chirp signal.

In some embodiments of the radar system, when the interchirp time is equal to or greater than the interchirp time threshold, the power control configuration is a slow-power control loop configuration or a combination of the slow-power control loop configuration and the fast-power control loop configuration that is used to adjust the amount of power used to amplify the chirp signal.

In some embodiments of the radar system, the fast-power control loop configuration utilizes a first cascode arrangement coupled to a second cascode arrangement to amplify the chirp signal that is transmitted by the radar system.

In some embodiments of the radar system, the slow-power control loop configuration utilizes a voltage regulator and a control signal from the power control unit to provide a supply voltage value that is used as supply voltage of the hybrid-power amplifier that amplifies the chirp signal.

In some embodiments of the radar system, the first cascode arrangement and the second cascode arrangement are located in a first stage of the hybrid-power amplifier, and the power control unit uses the first stage of the hybrid-power amplifier to adjust the amount of power to be transmitted by the radar system after amplification of the chirp signal by the hybrid-power amplifier.

In some embodiments, the radar system includes a look-up table that is used by the power control unit to ascertain output control signals and output values that are used by the hybrid-power amplifier to amplify the chirp signal that is output by the radar system.

In some embodiments, a method includes providing an interchirp time to a power control unit of a radar system and based upon an assessment of the interchirp time and a look-up table, adjusting output power of a chirp signal transmitted by the radar system.

In some embodiments of the method, the assessment of the interchirp time includes determining whether the interchirp time between a first chirp signal and a second chirp signal is greater than, equal to, or less than an interchirp threshold value.

In some embodiments of the method, when the interchirp time is less than an interchirp time threshold, a fast-power control loop configuration is used to reduce an amount of power dissipated to amplify the chirp signal.

In some embodiments of the method, when the interchirp time is equal to or greater than the interchirp time threshold, a slow-power control loop configuration or a combination of the slow-power control loop configuration and the fast-power control loop configuration is used to reduce the amount of power dissipated to amplify the chirp signal.

In some embodiments of the method, the fast-power control loop configuration utilizes a first cascode arrangement coupled to a second cascode arrangement to amplify the chirp signal that is output by the radar system.

In some embodiments of the method, the look-up table provides output values to a voltage regulator and a first stage of a hybrid-power amplifier for amplification of the chirp signal.

In some embodiments of the method, the look-up table provides output values that include a supply voltage value, at least a first gate voltage value and at least a second gate voltage value.

In some embodiments, a transceiver includes a hybrid-power amplifier and a power control unit coupled to the hybrid-power amplifier. The power control unit is configured to conduct an assessment of an interchirp time and a look-up table and, based upon the assessment, the hybrid-power amplifier uses a first stage of the hybrid-power amplifier to adjust an amount of power used to amplify a chirp signal transmitted by the transceiver.

In some embodiments of the transceiver, during amplification of the chirp signal transmitted by the transceiver, a first transistor of a first cascode arrangement is turned off in order to reduce the amount of power used to amplify the chirp signal.

In some embodiments of the transceiver, prior to the amplification of the chirp signal transmitted by the transceiver, the look-up table is generated by the power control unit in a controller in order to ascertain control signals that are provided to the first stage of the hybrid-power amplifier to amplify the chirp signal.

In some embodiments of the transceiver, a voltage regulator that outputs a supply voltage whose value is provided from the look-up table is used in combination with the first cascode arrangement and a second cascode arrangement to amplify the chirp signal. In one or more embodiments, a radar system is provided. The radar system includes a hybrid-power amplifier and a power control unit coupled to the hybrid-power amplifier. The power control unit is configured to control the amplification of a chirp signal output by the radar system based upon an assessment of an interchirp time provided by a chirp profile. The interchirp time is a time difference between a first chirp signal and a second chirp signal that are to be output by the hybrid-power amplifier. When the power control unit determines that the interchirp time is less than an interchirp time threshold, a fast-power loop control configuration is used to control the transmitted output power at hybrid amplifier level. When the power control unit determines that the interchirp time is equal to or greater than the interchirp time threshold, a slow-power loop configuration or a combination of the slow-loop configuration and the fast-loop configuration is used to control the transmitted output power at the hybrid-power amplifier. A look-up table generated by the power control unit in a controller is used to ascertain the control signals and values that are to be used by the hybrid-power amplifier and voltage regulator to amplify the chirp signal.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

The invention claimed is:

1. A radar system, comprising:
 a hybrid-power amplifier; and
 a power control unit coupled to the hybrid-power amplifier, wherein the power control unit is configured to select a power control configuration from at least one of two possible power control configurations based upon a duration of an interchirp time, wherein a first power control configuration is selected when the duration is a first duration and a second power control configuration is selected when the duration is a second duration, each power control configuration being applied to the hybrid-power amplifier to amplify a chirp signal that is transmitted by the radar system, and wherein a speed by which a transmitted power of the hybrid-power amplifier is adjusted during the interchirp time based on the selected power control configurations is different for the different durations of the interchirp time.

2. The radar system of claim 1, further comprising:
a chirp generator coupled to the power control unit, wherein the chirp generator generates the chirp signal that is amplified by the hybrid-power amplifier and output by the radar system.

3. The radar system of claim 1, wherein:
the interchirp time is a time difference between an end of a first chirp signal and a start of a second chirp signal that are output by the hybrid-power amplifier.

4. The radar system of claim 3, wherein:
when the interchirp time is less than an interchirp time threshold, the power control configuration is a fast-power control loop configuration that is used to adjust an amount of power used to amplify the chirp signal.

5. The radar system of claim 4, wherein:
when the interchirp time is equal to or greater than the interchirp time threshold, the power control configuration is a slow-power control loop configuration or a combination of the slow-power control loop configuration and the fast-power control loop configuration that is used to adjust the amount of power used to amplify the chirp signal.

6. The radar system of claim 5, wherein:
the fast-power control loop configuration utilizes a first cascode arrangement coupled to a second cascode arrangement to amplify the chirp signal that is transmitted by the radar system.

7. The radar system of claim 6, wherein:
the slow-power control loop configuration utilizes a voltage regulator and a control signal from the power control unit to provide a supply voltage value that is used as supply voltage of the hybrid-power amplifier that amplifies the chirp signal.

8. The radar system of claim 6, wherein:
the first cascode arrangement and the second cascode arrangement are located in a first stage of the hybrid-power amplifier, and the power control unit uses the first stage of the hybrid-power amplifier to adjust the amount of power to be transmitted by the radar system after amplification of the chirp signal by the hybrid-power amplifier.

9. The radar system of claim 1, further comprising:
a look-up table that is used by the power control unit to ascertain output control signals and output values that are used by the hybrid-power amplifier to amplify the chirp signal that is output by the radar system.

10. A method, comprising:
providing an interchirp time to a power control unit of a radar system; and
based upon a duration of the interchirp time and a look-up table, adjusting output power of a chirp signal transmitted by the radar system, wherein a power control configuration to adjust the output power is selected from at least one of two possible power control configurations based upon the duration of the interchirp time, wherein a first power control configuration is selected when the duration is a first duration and a second power control configuration is selected when the duration is a second duration, and wherein a speed by which a transmitted power of the hybrid-power amplifier is adjusted during the interchirp time based on the selected power control configurations is different for the different durations of the interchirp time.

11. The method of claim 10, wherein:
the assessment of the interchirp time includes determining whether the interchirp time between a first chirp signal and a second chirp signal is greater than, equal to, or less than an interchirp threshold value.

12. The method of claim 11, wherein:
when the interchirp time is less than an interchirp time threshold, a fast-power control loop configuration is used to reduce an amount of power dissipated to amplify the chirp signal.

13. The method of claim 12, wherein:
when the interchirp time is equal to or greater than the interchirp time threshold, a slow-power control loop configuration or a combination of the slow-power control loop configuration and the fast-power control loop configuration is used to reduce the amount of power dissipated to amplify the chirp signal.

14. The method of claim 13, wherein:
the fast-power control loop configuration utilizes a first cascode arrangement coupled to a second cascode arrangement to amplify the chirp signal that is output by the radar system.

15. A transceiver, comprising:
a hybrid-power amplifier; and
a power control unit coupled to the hybrid-power amplifier, wherein the power control unit is configured to determine a duration of an interchirp time and, based upon the duration, the hybrid-power amplifier uses a first stage of the hybrid-power amplifier to adjust an amount of power used to amplify a chirp signal transmitted by the transceiver, wherein a power control configuration to adjust the power is selected from at least one of two possible power control configurations based upon the duration of the interchirp time, wherein a first power control configuration is selected when the duration is a first duration and a second power control configuration is selected when the duration is a second duration, and wherein a speed by which a transmitted power of the hybrid-power amplifier is adjusted during the interchirp time based on the selected power control configurations is different for the different durations of the interchirp time.

16. The transceiver of claim 15, further comprising:
a chirp generator coupled to the power control unit, wherein the chirp generator is configured to generate the chirp signal that is amplified by the hybrid-power amplifier and transmitted by the transceiver.

17. The transceiver of claim 15, wherein:
the interchirp time is a time difference between an end of a first chirp signal and a start of a second chirp signal that are output by the hybrid-power amplifier.

18. The transceiver of claim 17, wherein:
when the interchirp time is less than an interchirp time threshold, the power control is configured to utilize a first cascode arrangement coupled to a second cascode arrangement to amplify the chirp signal transmitted by the transceiver.

19. The transceiver of claim 18, wherein:
the first cascode arrangement and the second cascode arrangement are located in the first stage of the hybrid-power amplifier, and the power control unit is configured to utilize the first stage of the hybrid-power amplifier to adjust the amount of power to be transmitted by the transmitter after the chirp signal is amplified by the hybrid-power amplifier.

20. The transceiver of claim 18, wherein:

when the interchirp time is equal to or greater than the interchirp time threshold, the power control unit is configured to utilize the look-up table to select an amount of supply voltage to be provided to hybrid-power amplifier.

* * * * *